Dec. 20, 1966  J. L. ROLL  3,292,889
DISPENSER HOLDER
Filed Dec. 2, 1964
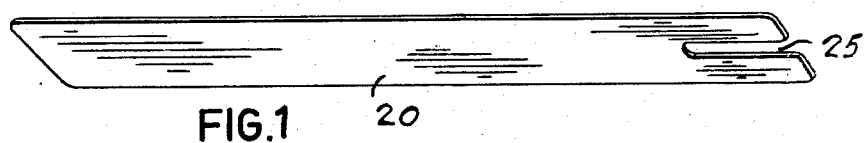
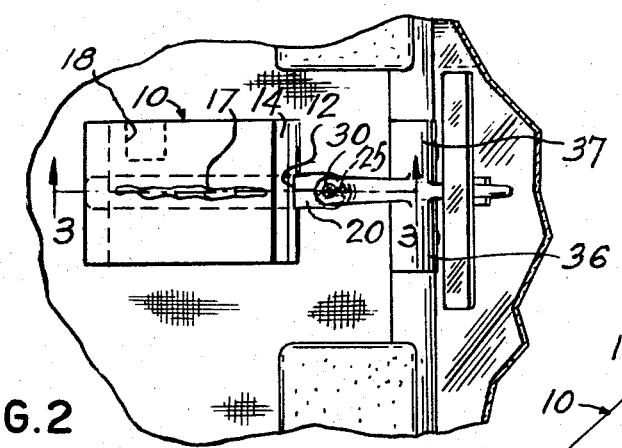
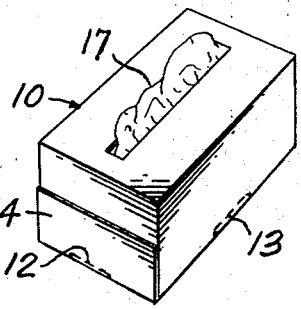
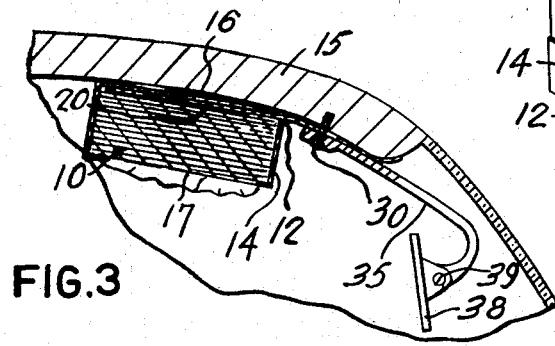
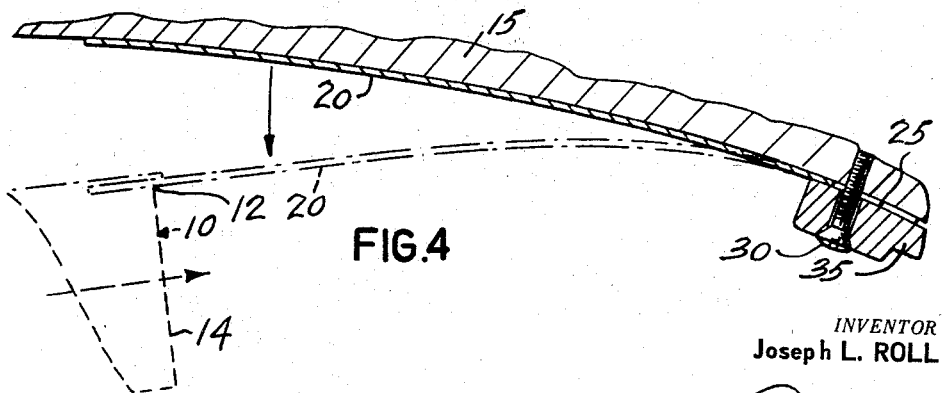
INVENTOR
Joseph L. ROLL
ATTORNEY

United States Patent Office 3,292,889
Patented Dec. 20, 1966

3,292,889
DISPENSER HOLDER
Joseph Leon Roll, 602 Inverness Ave., Mount Royal, Quebec, Canada
Filed Dec. 2, 1964, Ser. No. 415,235
Claims priority, application Great Britain, Dec. 3, 1963, 47,582/63
1 Claim. (Cl. 248—311)

This invention relates to a device for holding articles, specially disposable tissues in an accessible position.

There has always been a problem to find a convenient place for containers of disposable articles in an automobile so that they are readily accessible to the driver without interrupting his primary task of driving or with his view. The present invention accomplishes just that.

The invention comprises a flat, slightly flexible elongated metallic strip slotted at one end in order to receive a screw which secures the metal strip to a mounting bracket, for example, that of an automobile rear-view mirror bracket. This metallic strip supports a dispensing container provided with an opening in one of the side walls at the edge near an adjoining wall whereby the strip is juxtaposed in order to support this wall. The wall opposite the latter wall is preferably slotted for dispensing tissues and there may also be a dispensing opening in a side wall facing the driver.

When using an elongated rectangular paperboard box it is desirable to have an opening at one end on the side wall at its junction with the top wall so that the metallic strip lies under the top wall and inside the box above the tissues whereby the top wall bears on the strip and this supports the weight of the box and contents. The dispensing slot on the bottom wall is thus within easy access of the driver. If the box is of the type which also has a side opening possibly a side-top opening this will also be right in front of the driver. The front wall of the box may also be provided with an opening as well so that the box can be disposed sideways to the driver.

Having thus generally described the nature of the invention particular reference will be made to the accompanying drawings showing, by way of example, a preferred embodiment of the invention and in which:

FIGURE 1 is a perspective view of the flexible metal strip of the invention;

FIGURE 2 is a fragmentary plan view of an automobile interior provided with a suspended tissue container mounted on the strip;

FIGURE 3 is a fragmentary vertical cross-section of the automobile interior along line 3—3 of FIGURE 2.

FIGURE 4 is a fragmentary detailed vertical cross-section of the automobile interior as shown in FIGURE 3.

FIGURE 5 is a perspective view showing a container of the invention.

In the drawings, the metallic strip is shown as 20. A rear view mirror bracket 35 having wings 36 and 37 is mounted on the roof 15 by screw mountings not shown and a central screw 30 which enters a threaded opening in the roof 15. The rear view mirror 38 is mounted on the bracket 35 by means of a universal joint 39.

According to the invention, a flexible metal strip 20 is secured to the rear-view mirror mounting bracket 35 by the screw 30 extending through its slot 25. The strip 20 is biased by the mounting screw so that normally its exerts pressure upwards towards the roof of the car.

A facial tissue dispensing container of paperboard is provided on its end wall 14 with intermittent perforations 12, for receiving the free end of the strip 20. The flexible metal strip 20, preferably made of a resilient material for example, steel, bears against the upper wall 16 of the upsidedown container 10 urging it against the roof 15. The container is thus held in a position which neither obstructs the driver's view, nor the range of the rear view mirror 37 mounted on the bracket 35 in FIGURE 3. The container 10 has a "bottom" dispensing slot 17 from which the driver can pull tissues. It can also have a "front" dispensing opening 18.

In this description the terms "top," "bottom," and "side" and "end" have been used to described the walls of the container. Sometimes the "bottom" wall as mounted in the car will be what would be normally referred to as the "top" wall of the container as sold and normally used. What is meant by the respective terms will, however, be clear from the specific context.

When the container 10 is empty it is simply slipped laterally off the resilient strip 20 and replaced by a full container as shown in FIGURE 4.

The container 10 is also provided with a line of intermittent perforations 13 which permits mounting the container sideways. Actually the intermittent perforations 12 and 13 referred to in the description are potential slits. When the end of the strip 20 is pushed against the wall of the container in the area of the intermittent perforated line 12 or 13 as the case may be the wall ruptures along the weakened lines to form a slot.

Preferably a typical steel strip 10 would have a length of 7¾ inches, a width of 1½ inches, a slot length of 1¼ inches and a slot width of ¼ inch. However, it is evident that these dimensions are only by way of example and can be varied.

The strip 10 has been described as being preferably made of steel, in which case twenty guage steel is satisfactory. However, this material is mentioned only as an example and other materials, such as wood or plastic may be used. Similarly the principle of the invention can be applied to containers other than paperboard and for other purposes than tissue. For instance a package of cigarettes may be suspended by means of a proportionally smaller strip.

The retaining bracket has been described specifically as that of a rear-view mirror of a vehicle. However, it can be placed in other locations where there is a necessity to have such a container. A screw may be arranged wherein the strip may be anchored, preferably where there is a surface upon which the strip may resiliently urge the wall of the container. The strip has been descibed as having a slot. This is a preferred structure. This could however be an enclosed opening in certain cases, although this embodiment would have the disadvantage of having to remove the screw entirely to mount the strip whereas with the slot in the strip is can merely slid into position after loosening the screw.

I claim:

A tissue-dispensing assembly for permitting tissues to be dispensed from the inner surface of a ceiling, comprising in combination:

a bracket having an opening therethrough;

a fastener extending through said bracket opening and into said ceiling for securing said bracket in fixed relation on the inner surface of said ceiling;

an enlongated, flexible, flat strip element having an opening at one end, said flexible strip element being secured only at said one end in juxtaposed relation between said bracket and the inner surface of said ceiling with said fastener extending through the opening in said strip element, the remaining portion of said strip element normally being resiliently biased toward flat, juxtaposed and unobtrusive relation on the inner surface of said ceiling and comprising a cantilever support; and a container for containing tissues, said container including a base wall, bordering walls, and a wall opposite said base wall, at least one of said walls having an opening for permitting tissues to be withdrawn therethrough, one of said bordering walls including a slot opening adjacent the inner surface of said base wall, the major portion of said flexible strip element extending through said slot in biased relation toward the inner surface of said base wall whereby said container is retained against the inner surface of the ceiling and tissues can be withdrawn from said container.

References Cited by the Examiner

UNITED STATES PATENTS

| | | | |
|---|---|---|---|
| 1,910,094 | 5/1933 | Crane et al. | 221—45 |
| 2,655,338 | 10/1953 | Stoger | 248—311 |
| 2,694,610 | 11/1954 | Russell | 108—45 |
| 2,765,909 | 10/1956 | Graham | 206—57 |
| 2,990,950 | 7/1961 | Alexander | 206—57 |
| 3,046,049 | 7/1962 | Paxton | 296—97 |
| 3,110,467 | 11/1963 | Dube | 248—311 |
| 3,148,770 | 9/1964 | Cosman | 206—57 |
| 3,189,187 | 6/1965 | Guyer et al. | 248—311 X |
| 3,214,059 | 10/1965 | Stark | 248—311 X |

FOREIGN PATENTS 624,300  7/1961  Canada.

CHANCELLOR E. HARRIS, *Acting Primary Examiner.*

CLAUDE A. LE ROY, *Examiner.*

R. P. SEITTER, *Assistant Examiner.*